(No Model.)
D. CRIPPS.
FRUIT TREE PROTECTOR.
No. 445,048. Patented Jan. 20, 1891.
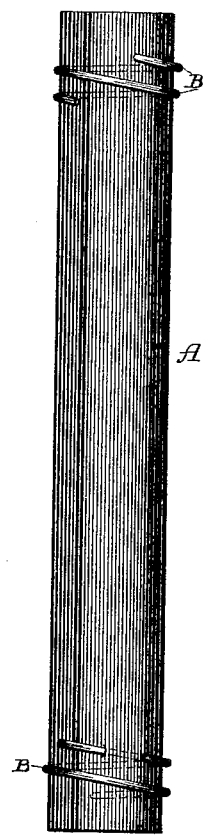
Witnesses:
E. P. Ellis,
B. Brockett,
Inventor:
David Cripps
per
Lehmann & Pattison
attys

UNITED STATES PATENT OFFICE.

DAVID CRIPPS, OF NEAR IUKA, ILLINOIS.

FRUIT-TREE PROTECTOR.

SPECIFICATION forming part of Letters Patent No. 445,048, dated January 20, 1891.

Application filed September 17, 1890. Serial No. 365,203. (No model.)

*To all whom it may concern:*

Be it known that I, DAVID CRIPPS, of near Iuka, in the county of Marion and State of Illinois, have invented certain new and useful Improvements in Fruit-Tree Protectors; and I do hereby declare the following to be a full, clear, and exact description of the invention, such as will enable others skilled in the art to which it pertains to make and use it, reference being had to the accompanying drawing, which forms part of this specification.

My invention relates to an improvement in fruit-tree protectors; and it consists in the construction which will be fully described hereinafter, and pointed out in the claim.

The object of my invention is to provide a protector for trees which will last until the tree has outgrown it, and which will protect the tree from borers and animals which destroy the bark, and which will prevent the tree from being injured by the whiffletree in plowing.

The accompanying drawing represents a side elevation of a protector which embodies my invention.

I take a piece of coal-tar or other prepared paper or material A of suitable width and length and wrap it one and one-half time around the tree. In order to hold this protector in position, I apply at its upper and lower ends and at any intermediate points desired the spiral springs B, which serve to prevent the paper from unwrapping and which hold it in contact with the tree. These springs being expansible, they allow the paper to gradually expand with the growing of the tree until it has reached such a growth that the paper will no longer answer to protect it, when another slip of paper is inserted under the springs to fill the vacancy.

This protector will be made to extend upward around the tree sufficiently high to prevent sheep, rabbits, and calves from eating the bark of the tree, and it also serves to protect the tree from borers and other insects by its stench, and to protect the tree from sudden changes of temperature and from the extreme heat of the sun.

This protector does not need to be looked after a number of times during the year; but after it is once placed in position it answers every purpose to which it is applied until the tree outgrows it.

Having thus described my invention, I claim—

A fruit-tree protector consisting of a sheet of suitable material coiled longitudinally around the tree, and spiral springs placed upon the outer surface of the paper between its upper and lower ends for yieldingly holding the paper in contact with the tree, substantially as shown and described.

In testimony whereof I affix my signature in presence of two witnesses.

DAVID CRIPPS.

Witnesses:
JOHN F. EDDINGS,
ISAAC N. GORDON.